Patented Nov. 3, 1931

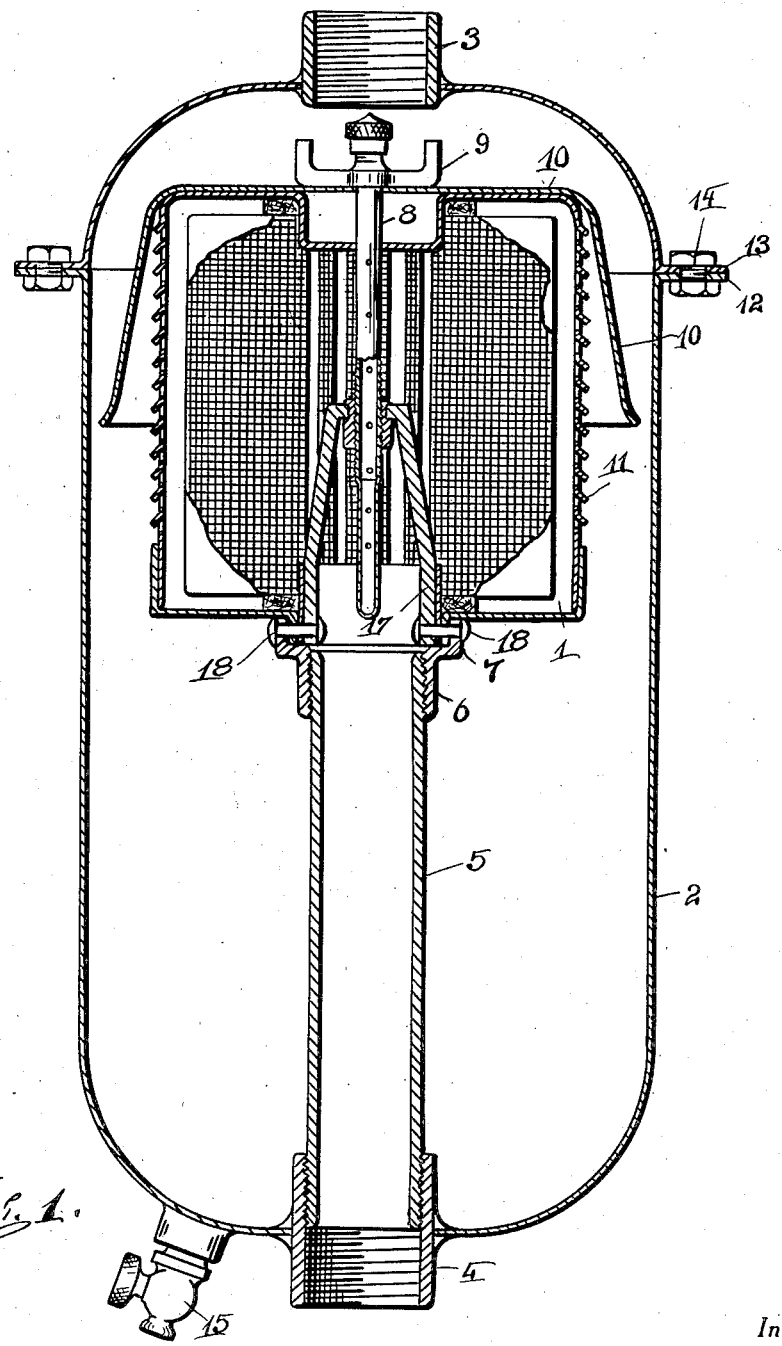

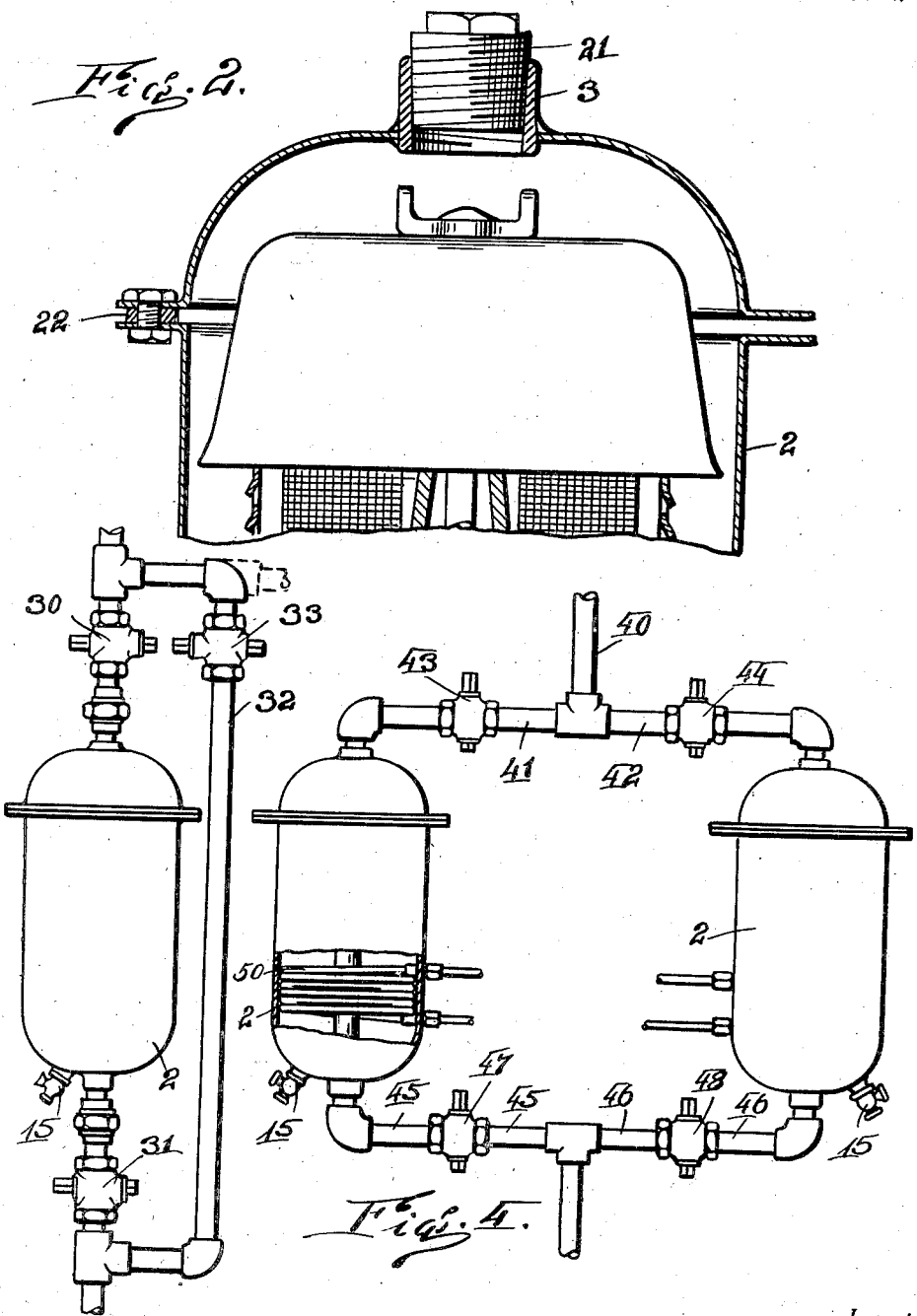

1,830,095

UNITED STATES PATENT OFFICE

LEWIS L. DOLLINGER, OF ROCHESTER, NEW YORK, ASSIGNOR TO STAYNEW FILTER CORPORATION, OF ROCHESTER, NEW YORK, A CORPORATION OF NEW YORK

PIPE LINE FILTER

Application filed May 15, 1928. Serial No. 277,927.

The object of this invention is to provide a pipe line filter in which the filter will be placed inside of a high pressure pipe line so that all of the air or other fluid that passes through the pipe line will have to pass through the filter and be purified thereby.

Another object of the invention is to place the filter in the pipe line in a way that will make it readily accessible for the purpose of removing and cleaning it.

This and other objects of the invention will be illustrated in the drawings, described in the specification and pointed out in the claims at the end thereof.

In the drawings:

Figure 1 is a vertical section through the pipe line, housing and filter showing the filter in place in the pipe line.

Figure 2 is a vertical elevation of the filter and housing, the housing being shown in vertical section.

Figure 3 is an elevation of a housing with the pipe line connections therefor.

Figure 4 is an elevation of two housings with the pipe line connections therefor.

In the drawings like reference numerals indicate like characters.

Pipe lines are used for carrying compressed air for various commercial purposes such as operating drills, pneumatic hammers or for operating a sand blast to clean buildings, etc. The air is under a pressure of as much as a hundred pounds or less in these pipe lines and solid matter such as scale, dirt etc. may be carried through the pipe line and get into the mechanism of the rock drill, pneumatic hammer, etc. and do considerable damage on that account. In order to prevent the compressed air carrying such solid matter, I provide a filter in the pipe line.

The filter described in this application is substantially the same as what is shown in any of my prior patents or pending applications such for example, Patent 1,580,291 or application 101,294 filed April 12, 1926, and such a filter is shown in the drawings and is indicated by the reference numeral 1. This filter is used for the purpose for cleaning the air that passes through the pipe line which pipe line is connected up to the housing 2, the air entering the housing at the inlet 3 and leaving the housing at the outlet 4. The outlet 4 is threaded and from it extends up into the housing a tube 5.

This tube 5 has a sleeve 6 threaded on the upper end thereof which sleeve at the upper end has an enlargement 7 which forms a seat for the casing of the filter. The parts of the filter are connected together by a stud 8 which engages with a yoke 17 which is fastened to the sleeve 6 by the rivets 18. The stud 8 has a threaded engagement with the yoke 17. The rivets also pass through the flange on the lower part of the filter casing and fasten it to the seat. The upper part of the casing telescopes into the lower part.

A metal casing 11 is provided for the filter and on top of this is provided a metal shield or hood 10 which covers the top of the filter and on the sides flares outwardly and permits the air to pass by the lower edge of it and around the lower edge and up under the hood into the sheltered casing under the hood. The air then passes through the filtering material of the filter and out through the tube 5.

The thumb nut 9 is threaded on the stud 8 and this thumb nut rests on the hood 10 and holds the various parts of the filter together and clamps them to the sleeve 6.

The pipe line is of substantially the same diameter as the inlet 3 and the outlet 4, but the housing 2 has a diameter several times the diameter of the pipe line and this is for the purpose of providing ample room for the filter. The clearance between the lower edge of the hood 10 and the housing 2 has approximately the same area as the area of the cross section of the pipe line, so that the air stream will pass through this annular space with about the same velocity that it passes through the pipe line. This causes the air to shoot down along the housing carrying any solid matter or liquid past the filter to the bottom of the housing, the air thereafter flowing up to the filter free of solid matter. It will be understood that air and gases and water vapor will go through the filter, but it is desired to keep all liquids away from the filter as far as possible.

The housing is therefore used as a trap for liquids, water and oil which are mostly trapped out and accumulate in the bottom of the housing with the solid matter that is trapped or strained out. The lower section of the housing is provided with a flange 12 and the upper section of the housing is provided with a flange 13, and these flanges come together so that the two sections of the housing can be clamped together by bolts 14 as is shown in the figure. By removing the bolts the upper section of the housing can be removed and the filter can be taken out.

When the filter is in place and two sections of the housing are joined together the filter is enclosed in an air tight receptacle. The air enters at the upper end 3 and passes down around the hood 10 and through the filter into the tube 5 from which it is delivered into the pipe line at the outlet 4. Any solid matter that comes in to the housing is warded off by the hood 10 and falls to the bottom of the housing where it collects until the housing is opened and cleaned. If any water passes through the pipe line it will collect in the bottom of the housing and can be drained off from time to time by the cock 15 which is provided for that purpose. For the purpose of cleaning the filter a valve that controls the pipe that leads to the inlet 3 may be closed, and the drain cock 15 may be opened. In this case the compressed air that is in the pipe beyond the outlet 4 will flow back through the filter at high velocity and will blow all solid matter off of the filtering surface and this solid matter will then drop down and collect in the bottom of the housing.

In Figure 2 I have shown an upper and lower section of the housing 2 spaced apart with an opening between, through which the air can enter, the top of the housing in this case is closed by a plug 21. The two sections of the housing are spaced apart by washers 22. In this case the housing and filter are not used as a high pressure pipe line filter because the air in the housing is substantially the same as atmospheric pressure. It has been found by experience that if so arranged the filter and housing can be used as a muffler on the intake of compressors, blowers, Deisel engines, etc. and when so used it acts not only as a filter, but as a silencer as well.

In Figure 3 I have shown a housing 2 similar to that shown in Figure 1 with the pipe connections therefor. In this case a valve 30 is placed in the inlet pipe and a valve 31 is placed in the outlet pipe, and a shunt pipe 32 is provided around the filter in which is placed a valve 33. In the normal operation the valve 33 will be closed and the valves 30 and 31 will be open.

When it is desired to clean the filter, the valve 30 will be closed and the valve 33 will be open. In such a case the high pressure air will flow down through the pipe 32 and up through the valve 31 into the housing and out through the filter and out through the cock 15. By this arrangement the air will flow through the filter in the reverse direction many times faster than it would flow through the filter in the normal direction, and this will blow the dust and all solid matter off of the filter and clean it.

In Figure 4 I have shown two housing 2, 2. The air comes in through the intake pipe 40 which branches at 41 and 42 and passes through the valves 43 and 44. It then passes through the housing 2, 2 and through the outlet pipes 45 and 46 and valves 47 and 48. In order to blow out the filter in the right hand housing 2, the valve 44 will be closed and the cock 15 of that housing will be open. The air will pass through the valve 43, through the left hand housing and through the valves 47 and 48 into the right hand housing and through the filter in the reverse direction and out through the cock 15. By closing the valve 43 and leaving the valve 44 open, the process will be reversed and the other filter will be blown out. In this case pure air will be used for blowing out both filters. It will also be understood that the compressed air in the pipe line beyond the filter may be used for blowing out the filter in which case the valves 30, 43 and 44 will be closed and the cock 15 would be open. In the assembly shown in Figure 4 one or the other of the valves 43 or 44 and one or the other of the valves 47 and 48 would be closed in which case but one filter would be blown out at a time. In the assembly shown in Figure 3 if the compressed air in the pipe line beyond the filter is used for blowing out the filter, the pipe 32 and 33 may be omitted.

It is desired in all cases that the housing and filter stand in vertical position so that water and oil will collect in the bottom of the housing and the housings and pipes shown in full lines are supposed to have a vertical position. The inlet and outlet pipes may be either vertical or horizontal and such pipes are shown in dotted lines. By the use of this filter close to where the compressed air is used, clean dry air will always be delivered.

Although the pressure in the pipe line and housing may be 60 pounds to the square inch or more, this does not mean that the filter will be subjected to any strain therefrom. As the air flows through the filter evenly and the pressure on both sides of the filter is practically the same, there is very little or no drop in the pressure of the pipe line at the filter.

In Figure 4 I have shown the housing provided with a refrigerating coil 50 placed in the housing below the filter. This coil is in line with the air stream as it comes down past the hood. This coil causes any moisture in the air stream to condense and drop into the bottom of the housing.

I claim:

1. A pipe line filter comprising a housing having an inlet and an outlet, an air filter mounted in said housing, a casing surrounding said filter with inlets in the sides of said casing, an outlet in the bottom of said casing, the outlet of the filter casing being directly connected to the outlet of the housing, a hood inside of the housing to cover the top of the filter and overhang the inlets into said casing and shed water from the filter but permit air to pass up under the hood to the filter.

2. A pipe line filter comprising a housing having an inlet and an outlet, an air filter mounted in said housing, said filter having an outlet, the outlet of the filter being directly connected to the outlet of the housing, the combination being arranged so that air under pressure passes into the housing through the inlet and passes out of the housing by passing through the filter and through the outlet of the filter and through the outlet of the housing, a by-pass between said inlet and said outlet adapted to pass air into the housing through the outlet and through the filter in the reverse direction to clean the filter.

3. A pipe line filter comprising a housing having an inlet and an outlet, an air filter mounted in said housing, a casing surrounding said filter with inlets in the side of said casing, an outlet in the bottom thereof, the outlet of the filter being directly connected to the outlet of the housing, a hood inside of the housing to cover the top of the filter casing and overhang the inlets into the side thereof and shed water from the filter but permit air to pass up under the hood of the filter, said hood having its lower end flared outwardly to direct the air along the housing to the bottom of the housing and permit it to return up centrally through the housing to the filter.

4. A pipe line filter comprising a housing having an inlet and an outlet, an air filter mounted in said housing, said filter having an outlet, the outlet of the filter being directly connected to the outlet of the housing, a hood inside of the housing to cover the top of the filter and shed water from the filter but permit air to pass up under the hood of the filter, said hood being adapted to direct the air along the housing to the bottom of the housing and permit it to return up centrally through the housing to the filter, a refrigerating element in the lower part of the housing with which the air comes in contact as it passes down along the housing and before it returns centrally of the housing to the filter said refrigerating element being adapted to condense the moisture in the air before it passes thru said filter.

5. A pipe line filter comprising a housing having an inlet and an outlet, said outlet having a circular seat thereon a filter and a casing therefor and a yoke adapted to rest on said seat, said yoke extending upward from said seat, said casing comprising a lower cup shaped section and an upper section adapted to telescope into it, the lower part of the filter casing and the yoke being fastened to the seat, a hood placed over the filter, a stud passing through the hood and making threaded engagement with said yoke by which the filter and its casing and hood are fastened in place on the seat.

6. A pipe line filter comprising a housing having an inlet and an outlet, an air filter mounted in said housing, a casing surrounding said filter with inlets in the side of said casing, an outlet in the bottom thereof, the outlet of the filter being directly connected to the outlet of the housing, a hood inside of the housing to cover the top of the filter casing and overhang the inlets into the side thereof and shed liquid from the filter, but permit the air to pass down beyond the hood and up under the hood to the filter, said hood expanding like the section of the cone and having its lower rim flared outward bell shaped.

7. A pipe line filter comprising a housing having an inlet at the top and an outlet at the bottom, a filter casing having an inlet in the side thereof and an outlet in the bottom thereof, a filter mounted in said filter casing, a pipe connecting said filter casing outlet with said housing outlet and supporting said filter casing between said housing inlet and said housing outlet and a hood overhanging said filter casing and the inlet in the side thereof below the inlet into said housing.

8. A pipe line filter comprising a housing having an inlet at the top and an outlet at the bottom, a filter casing having an inlet in the side thereof and an outlet in the bottom thereof, a filter mounted in said filter casing, a pipe connecting the filter casing outlet with the housing outlet and supporting the filter casing in said housing between its inlet and its outlet, a deflecting cup covering the top of said filter casing and overhanging the sides thereof to deflect the air entering the inlet of the housing and direct it past the filter casing but permit it to pass up under the deflecting cup to enter the inlet into the filter casing.

In testimony whereof I affix my signature.

LEWIS L. DOLLINGER.